(No Model.)

F. D. OWEN.
RIM AND TIRE FOR WHEELS.

No. 549,581. Patented Nov. 12, 1895.

Witnesses:
Sidney P. Hollingsworth
K. H. Banks.

Inventor,
Frederick D. Owen
by his attorney

UNITED STATES PATENT OFFICE.

FREDERICK D. OWEN, OF WASHINGTON, DISTRICT OF COLUMBIA.

RIM AND TIRE FOR WHEELS.

SPECIFICATION forming part of Letters Patent No. 549,581, dated November 12, 1895.

Application filed February 8, 1894. Serial No. 499,530. (No model.)

*To all whom it may concern:*

Be it known that I, FREDERICK D. OWEN, a citizen of the United States, residing at Washington, in the District of Columbia, have invented certain new and useful Improvements in Rims and Tires for Wheels; and I do hereby declare the following to be a full, clear, and exact description of the invention, such as will enable others skilled in the art to which it appertains to make and use the same.

This invention relates to pneumatic tires for bicycles and also to rims for fellies to be used in connection therewith.

The object of my invention is to adapt the ordinary concavo-convex rim or felly for use with a tire constructed to engage a mechanical fastening.

With this and other objects in view the invention consists in the matters to be described in the ensuing specification and then pointed out in the claims.

Figure 1:
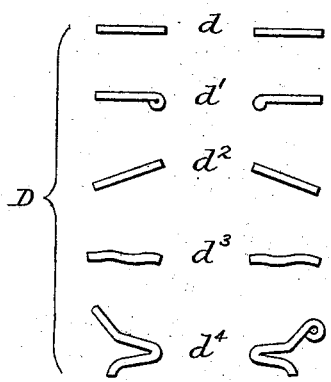
Figure 2:
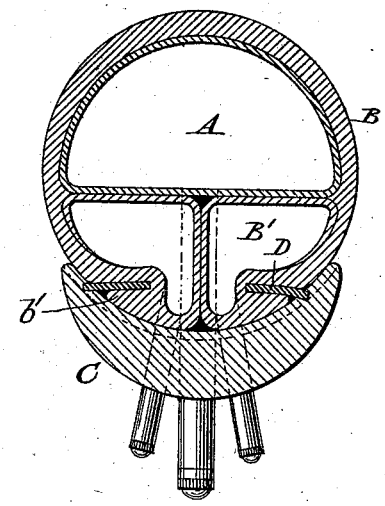
Figure 3:
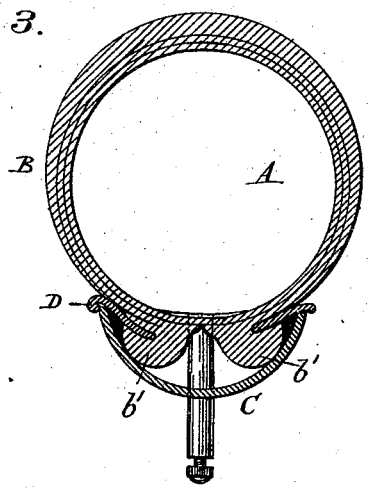
Figure 4:
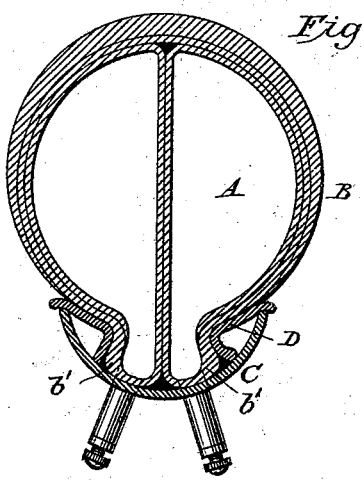

In the accompanying drawings, Figure 1 illustrates by sectional views various forms of mechanical fastenings adapted for use with an ordinary crescent-shaped rim. Figs. 2, 3, and 4 are sections of tires and rims, illustrating the applications of this part of my improvement.

The tires shown in Fig. 2 comprise an air-tube A and a shoe or cover B, said cover being provided at its edges with inflatable lobes or pockets B', the outer surface of the wall of each of which is provided with an outwardly-extending rib or projection $b'$, designed to lie within an undercut recess in a wheel-rim C, of special shape. These inflatable lobes B' may, as contemplated in my prior United States patents, be formed integral with the tire-cover B in a mold or be attached thereto by means of cement or otherwise, the ribs or projections $b'$ being preferably formed integral with said lobes B', though not necessarily, as it will be apparent that they may be cemented to or form a part of the exterior surface of the tire-cover B. As shown in said figure, the lobes are of such diameter as to rise above or beyond the peripheral edge of the wheel-rim C when inflated, the purpose of this construction being to prevent the air-tube A from coming in contact with and being cut or sheared by the edges of the rim C should the air-tube, on account of puncture or from other causes, become deflated while in use on the road. The outer surface of the walls of said lobes are, as before stated, provided each with an outwardly-extending longitudinal rib or projection $b'$, which engages an inwardly-projecting rib or lip of the rim C, said rib or projection $b'$ being held tightly within the recess adjacent to said lip by the outward pressure of air contained within said lobes. As the tire shoe or cover B is in the form of a ribbon with an inflatable lobe on each edge, it will be seen that by the deflation of either of the lobes that edge of shoe can be readily removed from the rim and the whole air-tube A be exposed for inspection or repair. This method of attaching the cover B to the rim C may also be employed with pneumatic tires wherein the inflatable edge lobe B' constitutes the air-tube of the tire, as shown in Figs. 3 and 4. As shown in these figures, the distention of the inflatable lobes B' will, owing to the outward pressure of air contained within them, force the ribs or projections $b'$ thereon into engagement with lips forming part of or lying within the wheel-rim C in a manner well understood, so that so long as the requisite air-pressure is maintained within the lobes $b'$ the cover B cannot be dislodged from the rim.

The object in providing tire-covers with inflatable edge lobes heretofore has been to provide for securing said cover to a rim by the lateral distention of said lobes within the rim. This will prove efficacious under most circumstances; but should one or the other of the lobes become deflated by leakage at the valve or elsewhere (a very common occurrence) the tire would become disengaged from the rim. The purpose of the construction above outlined is to afford the additional safeguard of a positive mechanical fastening, so that while the advantages derived from the lobed construction of cover are retained—that is, the cushioning effect of two or more independently-confined bodies of air and the total avoidance of any tendency of the tire to "creep"—the tire will be positively held in the rim, even though one or the other of the edge lobes should become deflated.

In Figs. 1, 2, 3, and 4 are illustrated mechanical fastening devices designed for use with "ordinary" or crescent-shaped wheel-rims to hold beaded tires or tire-covers therein, and designed to be used in lieu of the in-turned lips of a rim proper. This device consists of an endless band D of any suitable metal (two being used with each rim) laid within the concave tire-groove of a rim C, the smallest diameter of such band D being less than the greatest diameter of the rim, so that said band cannot be disengaged from the tire-groove of the rim by a bodily lateral movement, but will impinge upon the walls of said tire-groove, preferably at or near the outer edge thereof, so that lateral pressure outward, such as will be exerted by the air-pressure of a pneumatic tire, will not tend to dislodge the band D from the tire-groove, but, on the contrary, to seat it tightly against the side walls of said tire-groove adjacent to the edges of the rim.

Such a device is of great utility, as it enables a "special" tire of the so-called clincher type to be used in connection with ordinary concavo-convex rims C and is of special importance in connection with wooden rims, adapting them to be used safely with tires or tire-shoes lobed or otherwise constructed to be held in position in the tire-groove of a rim by what is known as a "mechanical fastening" or "dry fastening." In this connection it will be understood that the objection to specially-shaped metal rims is the increased cost of manufacture as compared to ordinary or concavo-convex rims, and, further, that they must be used with a special tire, and that the objection to special wooden rims, aside from the increased cost of manufacture, is that as they are grooved or channeled to receive the bead of the tire or tire-cover, so that the outward pressure of air, as also the lateral pressure or strain to which a tire is subjected in use, exerts an outward lateral pressure on the rim in the line of the grooves where the rim is thinnest, and therefore least adapted to withstand pressure or strain.

It will be understood that while under ordinary conditions of use some part of the retaining-bands will be in direct contact with the rim, in instances where a tire or tire-cover is provided with a rib or projection $b'$ exceeding the width of the bands D said rib or projection $b'$ may be interposed between both edges of the retaining-bands, so that said bands would not be in direct contact with the rim, and I intend the claims herein to cover such construction.

I do not wish to confine myself to any particular cross-sectional form of band D, as it may be round, oval, or, preferably, flat, and it will be apparent from the sections $d$ $d'$ $d^2$ $d^3$ $d^4$ in Fig. 1 that the flat form may be varied somewhat to suit special tires or the views of different manufacturers. It is essential, however, that said bands when in position for holding the edges of a tire shall be non-extensible, and I prefer that the inner edges thereof shall stand free from the body of the rim or felly, to more readily engage the beads of the tire, as shown.

The forms of band marked $d^3$ and $d^4$ in Fig. 1 are illustrated in Figs. 6 and 7 in their relation to a rim and tire, said forms resting or abutting at one point on the edge of the rim, and so serving to preserve said edges from battering or chipping. The form marked $d^4$ has bearing, also, at points between the edge of the rim and bottom of the tire-groove, thus giving additional strength of hold and adding materially to the strength of a rim, or, in other words, admitting of the employment of a much lighter rim.

In practice the bands D will be made of very light stock and of a diameter intermediate between that of the bottom of the tire-groove of a rim and the edges thereof, so that said endless bands may, by proper manipulation well understood, be seated within said groove or removed therefrom, as occasion may demand. For the sake of lightness I contemplate perforating these bands D or using a strip or strips of perforated sheet metal in their construction.

Under some conditions the intimate contact of iron or steel with vulcanized rubber has resulted in the formation of a sulphate the action of which has been to cement said rubber to the iron or steel. To avoid this result I intend to incase the bands D, or such parts thereof as are brought into intimate contact with the rubber of the tire or shoe, with a textile material or fabric applied in any preferred manner, my design being to prevent the actual contact of the sulphurized rubber with the metal of the bands, so that adherence or cementation of the parts may not take place. In practice the outer edges of these bands D lie in contact with the surface of the tire groove of the rim C, the inner edges thereof engaging the outwardly-extending ribs or projections $b'$ of the tire-cover B, so that outward or lateral pressure exerted by or upon the tire-cover serves to force the bands D outward and seat the outer edges thereof more tightly against the walls of the tire-groove.

I am aware that it is not new to provide a tire-cover with inflatable edge lobes adapted to be distended within a recessed wheel-rim, as such construction is illustrated in United States Patents heretofore granted to me, and I do not claim such a construction in this application.

What I claim is—

1. The combination with a wheel rim having a tire groove therein, of mechanical fastenings seated in said groove consisting of two metallic bands, each of which has a part, of less diameter than the greatest diameter of the rim, seated within the groove of the latter, and the outer edges of which bands extend without said groove, substantially as described.

2. The combination with a wheel rim having a tire groove therein, of mechanical fastenings seated in said groove consisting of two metallic bands the outer edges of which are of greater diameter than the greatest diameter of said rim, and portions of each of which bands engage the groove of the rim, substantially as described.

3. The combination with a wheel rim having a tire groove therein, and a tire having laterally extending ribs designed to lie within said grooves, of a mechanical fastening consisting of two metallic bands seated in contact with said groove and having their inner edges free from the groove to engage and hold the ribs of the tire and their outer edges extending without said groove, substantially as described.

4. The combination with a wheel rim having a tire groove, and a tire having outwardly extending ribs or projections, of a mechanical fastening consisting of two endless metallic bands seated in said tire groove, the inner edges of said bands being of less diameter, and the outer edges of greater diameter, than the greatest diameter of the rim, substantially as described.

5. The combination with a wheel rim having a tire groove, and a tire the outer part of which is provided at its edges with inflatable lobes having outwardly extending ribs or projections, of a mechanical fastening consisting of two metallic bands seated in the groove of the rim, said bands being of less diameter than the greatest diameter of the rim and the edges thereof resting in contact with the tire groove, substantially as described.

In testimony whereof I affix my signature in presence of two witnesses.

FREDERICK D. OWEN.

Witnesses:
C. A. NEALE,
K. H. BANKS.